United States Patent
Collins

[15] 3,656,346
[45] Apr. 18, 1972

[54] DEVICE AND METHOD FOR SAMPLING MOLTEN METAL

[72] Inventor: William J. Collins, 7005 Madison Street, Merrillville, Ind. 46401

[22] Filed: Aug. 5, 1970

[21] Appl. No.: 61,257

Related U.S. Application Data

[63] Continuation-in-part of Ser. No. 810,230, Mar. 25, 1969, abandoned, which is a continuation-in-part of Ser. No. 713,640, Mar. 18, 1968, abandoned.

[52] U.S. Cl. .......................................... 73/354, 73/DIG. 9
[51] Int. Cl. ..................................................... G01n 1/12
[58] Field of Search .............. 73/DIG. 9, 425.4, 354; 164/4, 164/253–257

[56] References Cited

UNITED STATES PATENTS 2,515,060   7/1950   Smith ............................... 73/421 MM
3,481,201   12/1969   Falk ................................. 73/425.4

Primary Examiner—S. Clement Swisher
Attorney—Charles S. Penfold

[57] ABSTRACT

A molten metal sampling device of the type incorporated in the end of a cardboard manipulating tube. A series of nested and perforated cups provide a tortuous entrance through a lower chamber passageway. A receiving chamber communicates with the lower chamber via a pair of passageways. In one embodiment the receiving chamber is divided by a partition into two secondary chambers. A thermocouple may be fixed in one of these secondary chambers to monitor the cooling of the metal sample as it solidifies.

18 Claims, 5 Drawing Figures

PATENTED APR 18 1972 3,656,346
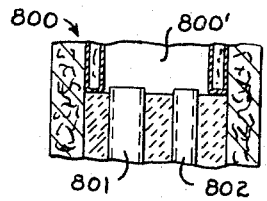
Fig.-4
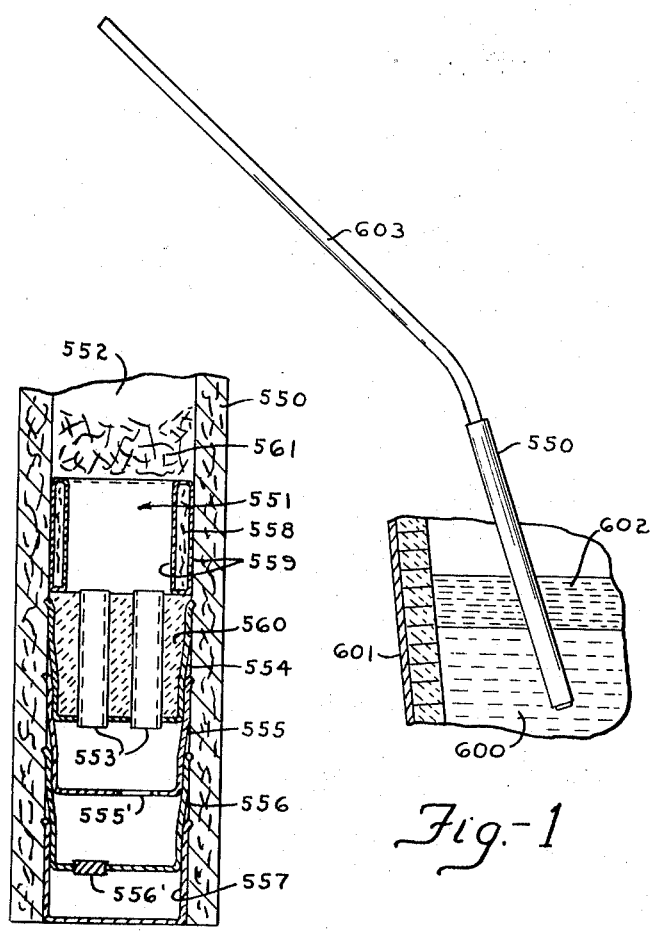
Fig.-1
Fig.-2
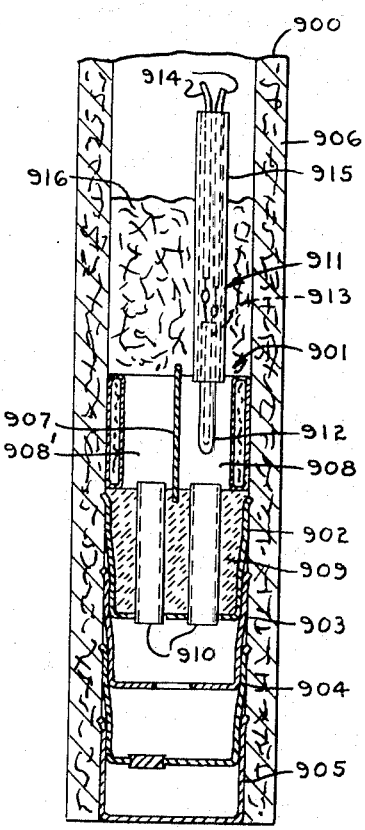
Fig.-5
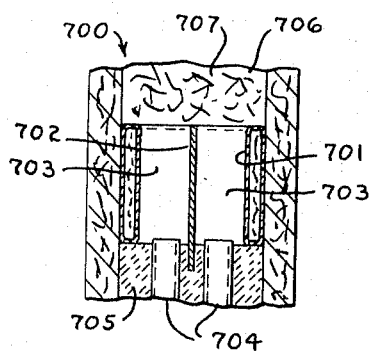
Fig.-3
INVENTOR.
WILLIAM J. COLLINS
BY
Charles S. Penfold
ATTORNEY

DEVICE AND METHOD FOR SAMPLING MOLTEN METAL

This application is a continuation-in-part of my application 810,230 filed Mar. 25, 1969, now abandoned, which was a continuation-in-part of my application Ser. No. 713,640 filed Mar. 18, 1968, now abandoned.

The device may be employed wherever applicable and has proven very efficient and reliable in obtaining samples of molten metal for chemical analysis of all of its elements including the amount of gases, such as oxygen, hydrogen and nitrogen contained therein may be ascertained. The sample may be obtained from any chamber such as an open hearth furnace, a basic oxygen vessel, electric furnace or related metal making facility. The sample obtained may also be tested to determine its physical characteristics.

A significant object of the invention is to provide an improved method of obtaining molten metal samples and method of assembling the components of the device.

The device, among other things, preferably comprises an outer protective housing; means providing upper chamber means in the housing for receiving the molten metal; supporting means, such as a mass of non-metallic or insulating material which assists in supporting the receiving means; means providing a lower chamber; and a pair of tubular means receiving means through which the metal may flow from the lower chamber into the upper chamber means when the device is dipped into a bath of molten metal. More explicitly, the upper chamber and tubular means provide a plurality of means for receiving metal samples.

A specific object of the invention is to provide a frangible upper chamber or receiving means which preferably includes a cylindrical member which, for example, is in the form of a relatively short cardboard cylinder protected by a sheath of ceramic material.

Another object of the invention is to provide a device in which the tubular receiving means, above referred to, are preferably embedded in a mass of non-metallic material, such as a cement substantially confined in a cup to provide a unit which is preferably press-fitted into the housing.

Also, an object is to provide a setup in which the upper chamber means is divided into a pair of smaller or secondary chambers which are respectively connected to the tubular means and have a common venting area within the confines of the housing and a filer common to the smaller chambers is disposed in the venting area.

A significant and specific objective of the invention is to provide a device in which a thermocouple may be operatively associated with either or both of the smaller or secondary chambers of the receiving means.

Additional objects of the invention reside in providing a device which offers advantages with respect to manufacture and assembly, efficiency, safety and whereby certain of its components may be readily broken apart or disassembled to obtain access to the sample or samples after the same have been obtained.

Other objects and advantages of the invention will become apparent after the description hereinafter set forth is considered in conjunction with the drawings annexed hereto.

In the drawings:

FIG. 1 is a view showing the mode of utilizing the sampling device in obtaining a sample from a bath of molten metal;

FIG. 2 is a vertical section taken through the sampling device shown in FIG. 1;

FIG. 3 is a partial vertical section of a modified device;

FIG. 4 is a partial vertical section of another modified device; and

FIG. 5 is a vertical section which substantially combines the structure of FIGS. 2 and 3 and shows a thermocouple operatively associated with one of the chambers of the device.

The disclosures with respect to FIGS. 2 and 4 are not being claimed in the subject application.

The device is unique in design and construction and preferably includes an elongated frangible or non-metallic tubular housing 550, a receiving means generally designated 551 defining an upper chamber, a venting chamber 552, a pair of glass tubes 553 and rimmed cups 554, 555, 556, and 557. The tubes or tubular means are preferably constructed from Pyrex glass but may be constructed of any desirable frangible material for the purpose and the cups are preferably constructed from metal. These tubes, as alluded to above, also constitute means for receiving metal or other material for sampling and analysis and the same is correspondingly true of a lower chamber defined by the cup 555.

The receiving means 551 is preferably in the form of a tube or cylindrical ring 558 of suitable frangible material, such as cardboard, which is protected or enclosed by a layer or coating of ceramic, insulating, or frangible material 559 so that at least the interior surface of the ring is protected. There may be some impregnation of the ceramic or insulating material into the receiving means depending on the character of these materials. The ring may be of moulded glass or ceramic material. The cross-sectional dimensions of the receiving means and housing are such that the receiving means may be readily press-fitted into the housing. However, if so desired, it may be cemented or otherwise anchored in place.

The cup 555 is provided with an aperture 555' through which the metal flows into the chamber defined by this cup prior to its entry into the tubes 553. The cup 554 preferably contains a mass 560 of cement or insulating material which surrounds and fixes the tubes 553 so that their lower ends respectively register with or extend through apertures provided therefor in the bottom wall of the cup and their upper ends project slightly above the mass and more or less into the receiving means 551 for communication therewith. Otherwise expressed, the tubes define passages leading to the means 551. The receiving means may rest against the mass or may be arranged to engage the cup 554.

The venting chamber 552 is directly above and communicates with the receiving means 551 and preferably contains a filter 561, such as a mass of steel wool, whereby to assist in retaining the sample in the receiving means for solidification while allowing air to escape as the metal flows from the lower chamber into the receiving means via the tubes 553.

It will also be observed that all of the cups are press-fitted into a nesting relationship and in combination with the cement and tubular means constitute a unit which is preferably press-fitted to a position substantially within the confines of the housing with the rims of the cups biting into the housing for locking the unit in place. The cup 556 is preferably provided with a deoxidizing element 556' and the bottom cup 557 serves to protect or otherwise prevent slag from entering into the device prior to its conditioning by the element. It should also be observed that the cup 556 also forms a chamber which communicates with the chamber defined by the cup 555 through the aperture 555'. When the device is dipped into a bath of molten metal it will successively flow into the cups 556, 555 and into the receiving means 551 through the tubular means 553 and when the device is withdrawn and the samples solidify they will include a pair of masses corresponding to the shapes of the cups 556 and 555, a pair of spindles or stems corresponding to the interior of the tubular means 553 and a mass corresponding to the shape of the receiving means 551. The housing 550, cups, insulating material 560, tubes 553 and receiving means 551 may be readily broken away, destroyed or separated to obtain access to the mass.

More particularly, the preferred method of recovering a sample comprises dipping the device into a molten metal bath 600 in a vessel 601, through a layer of slag or impurities 602 so that a lower end of the device will be below the layer as exemplified in FIG. 1. A long wand 603 is detachably fitted into the upper end of the housing 550 and is utilized to manipulate the device. The device is held in the bath but a brief period of time, for example, from 3 to 10 seconds, which causes the cup 557 to more or less disintegrate or be blown free, due to the enormous temperature change from, for example, 70° to 2,900° F. of the metal bath.

In FIG. 3 of the drawing, there is disclosed a modified device 700 which, among other things, has a primary chamber means or receiving means 701 which is divided by a partition 702 into a pair of smaller or secondary chambers 703 which are adapted to receive molten metal through a pair of tubes or receiving means 704. The partition is constructed of a material that will not deteriorate when subjected to the molten metal. A lower portion of the partition is preferably anchored or moulded into a mass 705 of insulating material or if desired, may be supported in place solely by the receiving means 701. It will be noted that the smaller chambers 703 having a common venting area 706 and that a filter 707 disposed in this area is also common to these chambers. With this setup a pair of samples may be obtained, each of which will include a semicircular head portion formed in a smaller chamber and an integral extension formed by one of the tubular means.

In FIG. 4 of the drawing, there is shown a modified device 800 which, among other things, discloses a chamber or receiving means 801 and a pair of tubular means 802 and 803 connected with the chamber. The tubular means are preferably of different diameters or cross-dimensions and offer a setup whereby samples having different diameters or cross-sectional shapes may be obtained therein as integral portions of a sample obtained in the chamber 808'. The insulating means of the devices shown in FIGS. 3 and 4 are actually provided with passages which establish communication with a chamber or chambers but also provide means for receiving molten metal for sampling purposes.

FIG. 5 discloses a device 900 which shows a receiving means generally designated 901 and a plurality of cups 902, 903, 904 and a cup or cap 905 substantially corresponding to those in FIG. 2, all of which are mounted or supported in a housing 906 of the device.

More particularly, the receiving means generally designated 901 substantially corresponds to that shown in FIG. 3 and provides a primary chamber which is divided by a partition 907 into a pair of secondary chambers or compartments 908 and 908' for receiving a hot liquid, such as samples of molten metal.

The uppermost cup 902 contains a mass of cement 909 and a pair of corresponding cylindrical tubes 910 of Pyrex or equivalent material are embedded in the cement and their lower ends extend through openings provided therefor in the bottom wall of the cup 902. The cups 902, 903, 904 and the cup or cap 905 are press-fitted into a nesting relationship to provide a unit or subassembly which may be pressed into the housing 906 so that the rims of the cups may bite into the interior cylindrical surface of the housing for anchoring the unit in place.

A significant feature of the device or structure, embodying the invention, shown in FIG. 5 is the inclusion of a thermocouple generally designated 911. The thermocouple is utilized to measure the freezing temperature of the sample. As the freezing temperature of steel is a function of the carbon content, a measurement of this temperature can be converted to carbon content to provide an immediate carbon analysis of the steel bath during the sampling procedure, thereby saving time over the analytical method. This factor is important because modern steel producing furnaces reduce the carbon content of the molten bath so rapidly that instantaneous measurements of the bath are necessary to satisfactorily arrive at the desired end point for the finished steel. The freezing temperature analysis is applicable to all baths of ferrous or non-ferrous metals. The thermocouple depicted preferably comprises an elongated hollow element or receptacle 912 which contains an elongated looped wire 913 having upper ends which are joined to a pair of insulated conductors 914, the latter of which extend outwardly through the upper end of the housing 906 for connection with a recording apparatus located at a remote location from the device. It will be observed that an upper portion of the element 912 is disposed in a cylindrical tube 915 and that the lower ends of the conductors 914 are disposed in the tube. It should also be noted that the lower end or extremity of the thermocouple extends into the chamber 908 and that the chambers are preferably vented through a fibrous filter 916 which is supported upon the receiving means and surrounds the tube 915 whereby to assist in supporting and stabilizing its position and in locating the lower end of the thermocouple in the chamber 908.

In view of the foregoing, it should be manifest that when the device 900 is dipped into a bath of hot liquid, such as molten metal, the cup or cap 905 may blow or disintegrate and that a deoxidizing element carried by the cup 904 will melt and mix with the incoming metal and the mixture then flows through an opening provided in the bottom wall of the cup 904 and thence substantially simultaneously through the tubes 910, which constitute receiving means and finally into the secondary chambers 908 and 908' and about the thermocouple so that samples may be obtained in these chambers and the temperature of the sample in chamber 908 may be readily ascertained.

Having thus described my invention, it is obvious that various modifications may be made in the same without departing from the spirit of the invention, and therefore, I do not wish to be understood as limiting myself to the exact forms, construction, arrangements, and combinations of parts herein shown and described.

I claim:

1. A device of the kind described comprising: a housing, a primary chamber disposed in said housing, a partition dividing said chamber into a pair of secondary chambers, a pair of passages respectively communicating with said secondary chambers, and a venting area provided in said housing and containing filter means, said venting area and said filter means being common to said secondary chambers.

2. A device of the kind described comprising: a housing provided with receiving means, means dividing said receiving means into a pair of chambers, a pair of tubular means, a mass of cement embedding said tubular means therein and in coextensive communicative connection with said chambers so that when the device is dipped into a hot liquid some of the latter will flow simultaneously into said chambers via said tubular means, and means common to and temporarily protecting said tubular means.

3. A device of the kind described comprising: an elongated housing, wall structure secured in said housing and defining a primary chamber, a partition dividing said chamber into a pair of secondary chambers, means fixedly secured in said housing and providing a pair of passages respectively communicating with said secondary chambers, the arrangement being such that when the device is dipped into a bath of hot liquid some of the liquid will simultaneously flow through the passages into the secondary chambers.

4. The device defined in claim 3, including a thermocouple mounted in operative relationship to one of said secondary chambers.

5. A device of the kind described comprising: a housing, a primary chamber disposed in said housing, a partition dividing said chamber into a pair of secondary chambers, a pair of passages respectively communicating with said secondary chambers, and a venting area provided in said housing for said secondary chambers so that when the device is dipped into a bath of hot liquid some of the liquid will flow freely through the passages into said secondary chambers.

6. The device defined in claim 5, including a thermocouple mounted in operative relationship to one of said secondary chambers.

7. A device of the kind described comprising: a housing, means providing a primary chamber disposed in said housing, a partition dividing said chamber into a pair of secondary chambers, a pair of passages respectively communicating with said secondary chambers, and filter means common to said secondary chambers disposed in said housing.

8. The device defined in claim 7, including a thermocouple mounted in operative relationship to one of said secondary chambers.

9. A device of the kind described comprising: an elongated cylindrical tubular housing, means providing a primary chamber in said housing, a partition dividing said chamber into a pair of chordal-like secondary chambers, support means secured in said housing, a pair of tubular means carried by said support means respectively communicatively connected to said secondary chambers, and means common to and supported in relation to said tubular means for temporarily protecting the same.

10. The device defined in claim 9, including a thermocouple mounted in operative relationship to one of said secondary chambers.

11. A device of the kind described comprising: a tubular housing, tubular heat resistant means fixedly secured concentrically in said housing and providing a primary chamber for receiving a hot liquid, means dividing said chamber into a pair of secondary chambers, a means supported in said housing and provided with a pair of elongated passages having inner ends communicating with said secondary chambers, and means common to and supported in relation to the opposite ends of said passages for temporarily protecting the same, the arrangement being such that when the device is dipped into a bath of hot liquid said common means will disintegrate and allow some of the liquid to freely flow into said secondary chambers via said passages.

12. The device defined in claim 11, including a thermocouple mounted in operative relationship to one of said secondary chambers.

13. A device of the kind described comprising: a housing, means providing a primary chamber disposed in said housing, a partition dividing said chamber into a pair of secondary chambers, and means disposed in said housing and supporting said partition and provided with a pair of passages respectively communicating with said secondary chambers.

14. The device defined in claim 13, including a thermocouple mounted in operative relationship to one of said secondary chambers.

15. A device of the kind described comprising: a housing, means providing a primary chamber disposed in said housing, non-metallic means protecting an interior surface of said chamber, means dividing said primary chamber into a plurality of secondary chambers, and support means provided with a plurality of passages respectively communicating with said secondary chambers whereby fluid may simultaneously flow into said secondary chambers via said passages.

16. The device defined in claim 15, in which said passages comprise non-metallic tubes which are embedded in said support means.

17. A method which comprises dipping a receiving means having a primary chamber divided into a pair of secondary chambers with a pair of passages respectively communicating with the bottoms of said secondary chambers into a bath of molten metal thus simultaneously initiating the flow of some of the latter through the passages into said secondary chambers to obtain samples thereof, removing the receiving means and samples from the bath for cooling and then breaking the receiving means to obtain the samples.

18. A method which comprises dipping a device having a receiving means defining a chamber divided into a pair of secondary chambers and a pair of passages communicating with said secondary chambers into a hot liquid thus simultaneously initiating the flow of some of the latter through the passages into the secondary chambers to obtain samples thereof, removing the device and samples from the liquid, and then allowing the liquid to cool and solidify in said secondary chambers and said passages.

* * * * *